Patented July 24, 1951

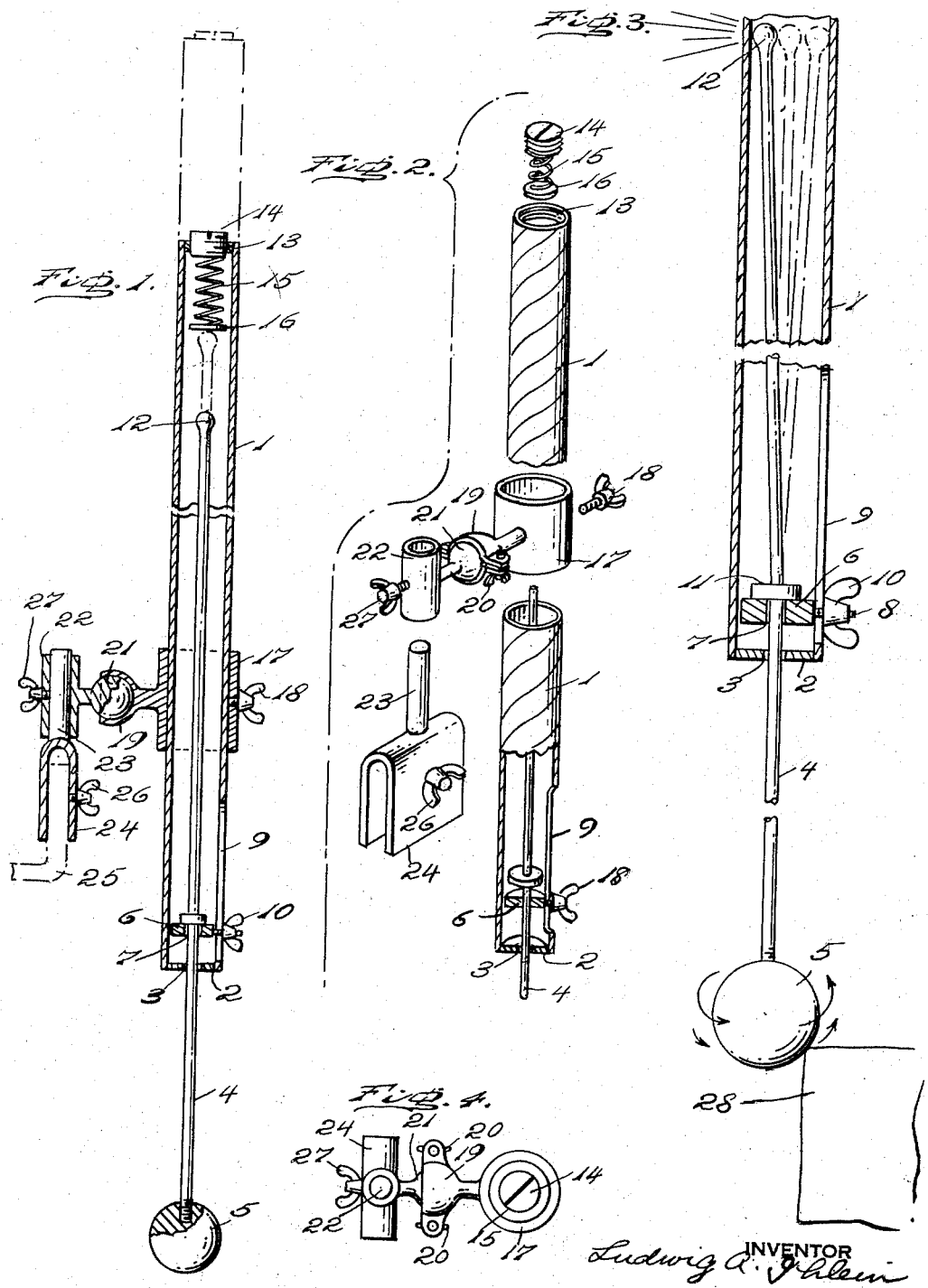

2,561,865

UNITED STATES PATENT OFFICE 2,561,865

CURB FINDERS FOR MOTOR VEHICLES

Ludwig A. Ihlein, Philadelphia, Pa.

Application June 9, 1950, Serial No. 167,121

2 Claims. (Cl. 116—28)

The object of this invention is to devise a novel curb finder for motor vehicles to aid the driver to park the vehicle alongside of a curb or other obstruction, and thereby prevent injury to the tires and fenders of the motor vehicle.

A further object of the invention is to devise a novel curb finder which will give an audible signal to the driver when the vehicle is moving with the finder contacting the curb of the street.

A further object is to devise a novel construction of curb contacting member; novel means for mounting it so that it can revolve when contacting the curb, and novel means for adjusting the position of said member.

With the foregoing and other objects in view as will hereinafter clearly appear, my invention comprehends a novel curb finder which will signal to the driver when a ball is contacting a curb or other obstruction.

It further comprehends a novel curb contacting member, novel means for mounting it on a motor vehicle, and novel means for adjusting its position.

It further comprehends a novel curb finder pivotally and rotatably mounted within a flexible tube and vertically adjustable therein, the flexible tube being adjustable in a carrier having an universal mounting.

For the purpose of illustrating the invention, I have shown in the accompanying drawings a preferred embodiment of it which, in practice, will give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a sectional elevation of a curb finder embodying my invention.

Figure 2 is an exploded view of certain of the component parts.

Figure 3 is a sectional elevation of a portion of the curb finder, showing the curb contacting member as contacting a curb.

Figure 4 is a top plan view of the curb finder.

Similar numerals of reference indicate corresponding parts.

Referring to the drawings:

The curb finder has its body portion in the form of a flexible metallic tube 1 having a closure 2 at its lower end provided with an opening 3 in which the rod 4 has a clearance, said rod carrying at its lower end a ball 5 which, as shown, is in threaded engagement with the rod. The downward position of the ball 5 is limited by a collar 6 having an opening 7 through which the rod passes with a clearance, and the rod is provided with a threaded stem which passes through a vertical slot 9 in the tube 1 and is provided with a thumb nut 10. An abutment 11 fixed to the rod contacts the top face of the collar 6, thereby limiting the downward movement of the ball 5. The upper end of the rod 4 is enlarged as at 12 and is preferably rounded to contact the inner wall of the tube 1.

The tube 1 is preferably copper and has at its upper end a threaded washer 13 to receive a threaded plug 14 which carries a spring 15 having at its lower end a disc 16 which is contacted by the upper end of the rod 4, so that when the rod is moved upwardly it will be forced downwardly by the spring and cannot become stuck in the tube 1.

The flexible tube 1 is vertically adjustable in a carrier 17 which is tubular to slidably receive the flexible tube and a set screw 18 in threaded engagement with the carrier fixes the tube in its adjusted position in the carrier. The carrier 17 has a split socket 19 which is clamped by a screw or bolt 20 around a ball 21 which latter is connected with a pipe 22 rotatably carried by a post 23 on a bracket 24 which can be clamped to a part or extension 25 of a motor vehicle by a set screw 26. The pipe 22 is fixed in its adjusted position on the post 23 by a set screw 27.

In Figure 3, I have indicated an obstruction or curb 28.

The operation will now be clear to those skilled in this art and is as follows:

Assuming that the device has been secured to the motor vehicle, and the carrier adjusted in the desired position by the ball and socket joint, the tube is vertically positioned in the carrier by the set screw 18.

The ball is held at a desired heighth above the street by its abutment or shoulder 11 which rests on the collar 6. The ball has sufficient mass so that it moves downwardly due to gravity and its own weight so that the ball is in its lowermost downward position unless raised by contact with a curb or other obstruction. The ball and its rod are free to revolve and when the ball comes into contact with a curb the ball will revolve and the rod will tilt and the upper end of the rod will strike the inner wall of the metallic tube 1 and produce an audible signal to indicate to the driver that he is close to the curb, and the relative position of the motor vehicle and the curb.

If the ball and its rod is moved upwardly by a curb or obstruction sufficiently to tension the spring 15, such spring will cause the rod to move downwardly and prevent the rod from becoming stuck in a raised position.

The ball of the ball and socket is angularly adjustable in a lateral direction on its post 22 and the body portion formed by the metallic tube 1 is universally adjustable by the ball and socket and vertically adjustable in the carrier 17. Due to the provision of the slot 9 and the set screw 18, the collar 6 can be vertically adjusted to position the contact ball at a desired height above the ground, as may be desirable when there is a heavy fall of snow.

Having thus described my invention, what I claim as new and desire to secure by Letters Patent is:

1. In a curb finder for motor vehicles, a carrier, a flexible tube vertically adjustable in said carrier, means to fix the tube in its adjusted position, a rod within the tube having a clearance therein and freely movable through the lower end of the tube, a weight fixed to the lower end of the rod, means to limit downward movement of the rod, a closure for the upper end of the tube, a spring between the closure and the upper end of the rod and in the path of movement of the upper end of the rod, and a bracket on which the carrier is mounted for turning movement.

2. The construction defined in claim 1 wherein the upper portion of the rod cooperates with the inner wall of the tube to produce an audible signal when the weight is moved by contact with a curb.

LUDWIG A. IHLEIN.

REFERENCES CITED

The following references are of record in the file of this patent:

UNITED STATES PATENTS

| Number | Name | Date |
|---|---|---|
| 157,562 | Windle et al. | Dec. 8, 1874 |
| 1,735,212 | Pawsat | Nov. 12, 1929 |
| 2,183,438 | Zaiger | Dec. 12, 1939 |